United States Patent

[11] 3,552,592

| [72] | Inventor | Larry R. Hartman |
| | | Kalamazoo, Mich. |
| [21] | Appl. No. | 820,791 |
| [22] | Filed | May 1, 1969 |
| [45] | Patented | Jan. 5, 1971 |
| [73] | Assignee | Lear Siegler, Inc. |
| | | Santa Monica, Calif. |
| | | a corporation of Delaware |

[54] MATERIAL HANDLING TRAY
6 Claims, 6 Drawing Figs.

[52] U.S. Cl. .................................................. 220/1,
206/72; 211/126
[51] Int. Cl. ...................................................... B65d 1/00,
B65d 1/34
[50] Field of Search ............................................. 220/1, 18;
211/126; 248/211; 206/72

[56] References Cited
UNITED STATES PATENTS
3,018,003  1/1962  Lockwood .................... 211/126
3,139,188  6/1964  Goetz et al. .................... 211/126
3,182,811  5/1965  Bartlett et al. .................. 211/126

Primary Examiner—Raphael H. Schwartz
Attorney—Barnard, McGlynn & Reising

ABSTRACT: Material handling apparatus comprising a one-piece molded plastic tray for receiving articles, packages and other material fed to the tray manually or by a conveyor such as in grocery store checkout counters and the like. The tray is molded in one piece from ABS (acrylonitrile-butadiene-styrene) resins and is formed with two substantially parallel sides and an end wall with an unobstructed entrance end for receiving articles or material fed to the tray. The tray is formed in such a manner that it has no sharp corners at the junctions between the side and end walls and the bottom wall, the plastic material of the tray providing a low friction surface for receiving and collecting articles and packages.

PATENTED JAN 5 1971
3,552,592
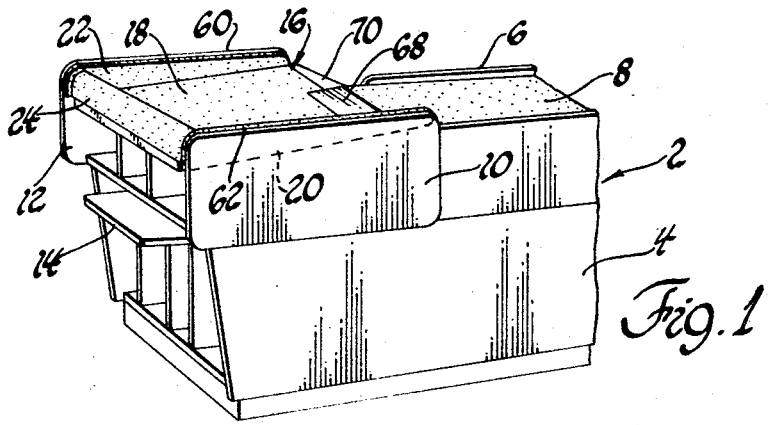
Fig.1
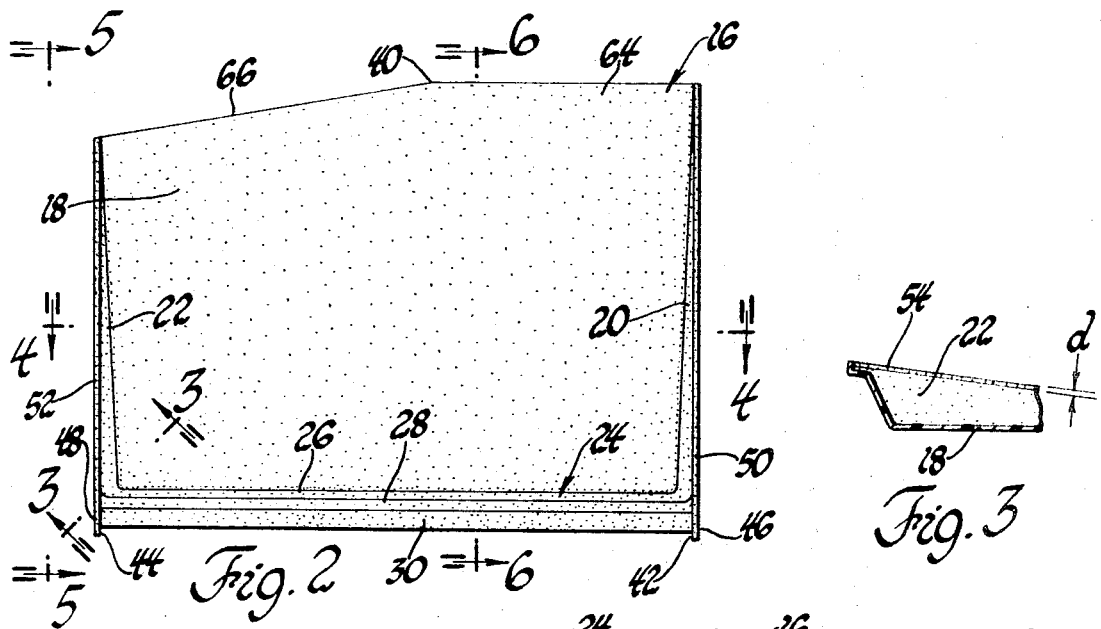
Fig.2  Fig.3
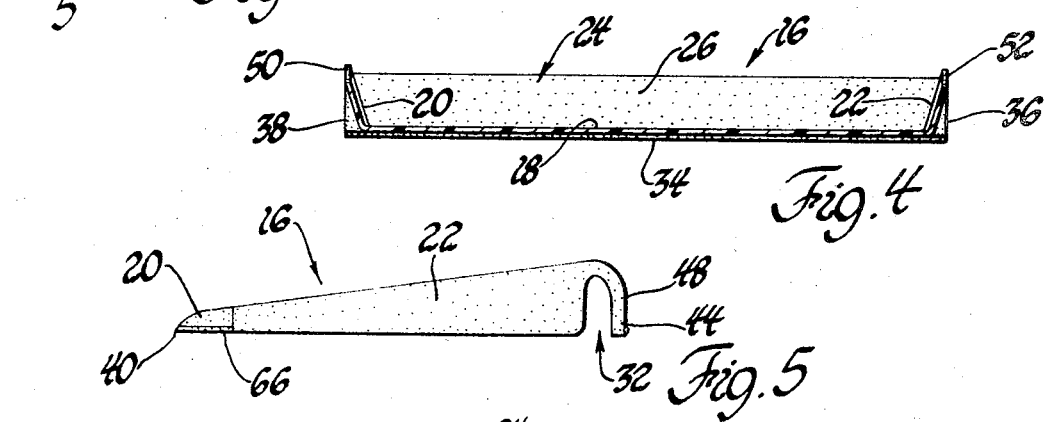
Fig.4
Fig.5
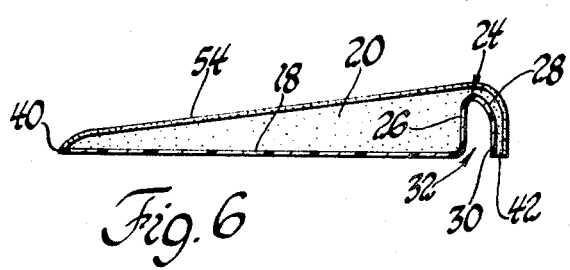
Fig.6
INVENTOR.
Larry R. Hartman
BY
Barnard, McGlynn & Reising
ATTORNEYS

MATERIAL HANDLING TRAY

This invention relates generally to material-handling apparatus and is particularly concerned with the construction of a tray or the like for use with material-handling apparatus such as employed in grocery store checkout counters for receiving and collecting articles fed to the tray manually or from a feed conveyor or the like.

In a material and article-handling apparatus such as the type used in grocery store checkout counters, the articles and packages must be collected for bagging after they have been checked out by the cashier. The articles are usually fed either manually or by a moving conveyor belt from the cashier to a collection area from which they are then placed in bags to be carried from the store.

An object of this invention is to provide a one-piece molded plastic tray for material-handling apparatus to be used for collecting and receiving articles and packages, the tray having two sidewalls and an end wall with an unobstructed entrance edge for receiving articles fed to the tray.

A further object is to provide a tray for receiving articles for material-handling apparatus such as employed in grocery store checkout stands that is molded in one piece with a shape and corner radii of curvature such that no sharp corners or buildup of crevices is provided, and which can be suitably formed from a low-friction plastic material.

Another object is to provide a one-piece, molded plastic article-receiving tray especially adapted for use with grocery store checkout counters constructed for easy installation in a checkout counter.

In carrying out the foregoing, and other objects, material-handling apparatus according to this invention comprises a one-piece molded plastic tray with a bottom wall, a pair of sidewalls projecting upwardly from the side edges of the bottom wall and inclined outwardly therefrom with an end wall extending between the sidewalls. The end wall has an inner portion projecting upwardly from the bottom wall and extending between the sidewalls, and is further formed with an upper curved portion extending from the upper edge of the inner portion away from the bottom wall and an outer portion depending from the opposite end of the curved portion in spaced relationship with the inner portion to define a groove therebetween. Flanges project from the ends of the end edges of the outer portion for engaging the sidewalls of the mounting structure on the checkout counter.

Other objects, advantages and features of the invention will become apparent from the following description taken in connection with the accompanying drawings in which:

FIG. 1 is a perspective view of a portion of a grocery store checkout counter having a material-receiving tray embodying the invention;

FIG. 2 is a plan view of the material-receiving tray shown in the assembly of FIG. 1;

FIG. 3 is a sectional detailed view taken on line 3–3 of FIG. 2;

FIG. 4 is a sectional view taken on line 4–4 of FIG. 2;

FIG. 5 is a view taken along line 5–5 of FIG. 2; and

FIG. 6 is a sectional view taken on line 6–6 of FIG. 2.

In FIG. 1, reference numeral 2 collectively designates a portion of a checkout counter for a grocery store having front and rear walls 4 and 6, respectively, with a top deck 8 which may have a feed conveyor mounted thereon so that an attendant, after ringing up the price of an article on a cash register, can move the material towards the left in FIG. 1 to make room for other articles. The articles are moved to the left to a collection area defined between front and rear supporting panels 10 and 12, respectively, between which is mounted a material-receiving tray designated generally by reference numeral 16 for receiving and collecting articles fed from the deck portion 8. The articles collected onto the tray 16 are then usually placed in bags, the bags being supported on a bagging shelf 14 which can be extended and retracted from the end of counter 2.

The material-handling tray 16 is illustrated in detail in FIGS. 2 through 6. Thus, according to the present invention, the material-handling apparatus comprises a one-piece molded plastic tray 16 having a bottom wall 18. A pair of sidewalls 20 and 22 project upwardly from the side edges of the bottom wall 18 and are inclined outwardly from the bottom wall as shown, for example, in FIG. 4. An end wall 24 has an inner portion 26 projecting upwardly from the bottom wall and extending between the sidewalls 20 and 22. The end wall further has a curved portion 28 extending from the upper edge of the inner portion 26 away from the bottom wall, and an outer portion 30 depends from the end of curved portion 28 in spaced parallel relationship with the inner portion 26 to define a groove 32 therebetween (FIGS. 5 and 6).

As shown in FIG. 4, the bottom edge 34 of the rear portion 30 projects outwardly from the junction between the sidewalls 20 and 22 and the bottom wall 18, the rear portion 30 having end edges 36 and 38 perpendicular to the bottom edge 34 which merge with, and form a continuation of, the associated end edges of the curved portion 28. Tray 16 has an unobstructed entrance edge 40 on the bottom wall opposite the end wall 24.

Projecting perpendicularly from each of the end edges 36 and 38 of the outer portion 30 of the end wall 24, and from the end edges of the curved portion 28, are flanges 42 and 44. Flanges 42 and 44 project from the rear portion 30 of the end wall 24 in the opposite direction from the bottom wall 18. Flange 44 has an outer edge 48 which merges with the upper edge 52 of its associated sidewall 22 and forms a continuation thereof. Similarly, flange 42 has an outer edge 46 that merges with the upper edge 50 of its associated sidewall 20 and forms a continuation thereof.

As shown most clearly in FIGS. 5 and 6, the height of each of the sidewalls 20 and 22 above the bottom wall 18 decreases uniformly from the end wall 24 toward the entrance edge 40. As illustrated in FIG. 2, the entrance edge 40 has a first portion 64 extending from one side edge of the bottom wall adjacent sidewall 20 toward the other side edge of the bottom wall, the portion 64 being parallel to the end wall 24. A second portion 66 extends from the inner end of the first portion 64 that is inclined toward the end wall 24 and is in nonparallel relationship with the end wall 24. The upper edge of the sidewall 20 is curved downwardly to merge with the portion 64 of the entrance edge whereas the end of the sidewall 22 opposite end wall 24 is struck away to define a vertical end edge as shown in FIG. 5, the lower end of the vertical edge joining the outer end of portion 66 at the junction between sidewall 22 and the bottom wall 18.

The material-handling tray 16 is mounted between the supporting members 10 and 12 such that the flanges 42 and 44 engage the inner surfaces of the panels 10 and 12, and the upper edges of the sidewalls extend along the inner surfaces of the members 10 and 12. Groove 32 may be engaged by a support member extending transversely between panels 10 and 12, and a molding strip of stainless steel or similar material may be provided to overlie the upper edges of panels 10 and 12 as well as the upper edges of the sidewalls 20 and 22 of the tray 16. The molding strips are indicated by reference numerals 60 and 62, each of which has an inner, downwardly depending flange for engaging the inner side of the upper edge of the sidewalls 20 and 22. To accommodate the vertical inner flange of the molding strip 60 and 62, the sidewalls 20 and 22 are formed with a vertical inner edge 54 formed along their upper edge and extending vertically for a distance $d$ as indicated in FIG. 3 for receiving the flange of the molding strip.

Plates 68 and 70 of stainless steel, or other material, may be provided to overlie the entrance edge 40 and bridge the space between the deck portion 8 and the bottom wall 18 of the tray 16. The inclined portion 66 of the entrance edge 66 can accommodate an angular relationship between the deck portion 8 or a conveyor belt mounted thereon, and the tray 18.

The curved portion 28 of the end wall 24 may have a compound curvature such that the segment adjacent the upper edge of the inner portion 26 as viewed in FIG. 6 has a smaller radius than that of the segment extending from the upper edge of the outer portion 30. The corners between the sidewalls 20 and 22 and the inner portion 26 of the end wall 24 are curved smoothly to blend with both the side and end walls. Moreover, the junction between the bottom wall and the side and end walls are provided with generous radii of curvature to avoid sharp corners.

While a specific form of the invention is illustrated and described in the foregoing specification and accompanying drawings, it should be understood that the invention is not limited to the exact construction shown, but that other forms, all falling within the scope and spirit of the invention, will be apparent to those skilled in the art.

I claim:

1. Material-handling apparatus comprising: a one-piece molded plastic tray having a bottom wall; a pair of sidewalls projecting upwardly from the side edges of the bottom wall and inclined outwardly from the bottom wall; an end wall having an inner portion projecting upwardly from the bottom wall and extending between the sidewalls, a curved portion extending from the upper edge of said inner portion away from the bottom wall, and an outer portion depending from the end of the curved portion in spaced relationship with said inner portion to define a groove therebetween, the bottom edge of said outer portion projecting outwardly from the junction between the sidewalls and bottom wall, said outer portion having end edges perpendicular to the bottom edge thereof which merge with and form a continuation of the associated end edges of the curved portion; and an unobstructed entrance edge on said bottom wall opposite said end wall.

2. Material-handling apparatus as claimed in claim 1 further including a flange projecting perpendicularly from each of the end edges of said outer portion and said curved portion.

3. Material-handling apparatus as claimed in claim 2 wherein said flange projects from said outer portion of said end wall in the opposite direction from the bottom wall and has an outer edge that merges with the upper edge of the associated sidewall and forms a continuation thereof.

4. Material-handling apparatus as claimed in claim 3 wherein the height of each of the sidewalls decreases uniformly from said end wall toward said entrance edge.

5. Material-handling apparatus as claimed in claim 4 wherein said entrance edge has a first portion extending from one side edge of the bottom wall toward the other side edge of the bottom wall that is parallel to the end wall, and a second portion extending from the inner end of said first portion that is inclined toward the end wall and is in nonparallel relationship with the end wall.

6. Material-handling apparatus as claimed in claim 5 further including a vertical inner edge formed along the upper edge of the sidewalls for receiving a molding flange.